(12) United States Patent
Alameh

(10) Patent No.: US 10,126,857 B2
(45) Date of Patent: *Nov. 13, 2018

(54) DUAL DIAGONAL THERMOPILE CONTROL OF AN APPARATUS

(71) Applicant: Motorola Mobility LLC, Chicago, IL (US)

(72) Inventor: Rachid M Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/931,212

(22) Filed: Nov. 3, 2015

(65) Prior Publication Data

US 2017/0115795 A1    Apr. 27, 2017

Related U.S. Application Data

(63) Continuation-in-part of application No. 14/919,988, filed on Oct. 22, 2015.

(51) Int. Cl.
  *G06K 9/00* (2006.01)
  *G06F 3/041* (2006.01)
  *G06F 3/16* (2006.01)

(52) U.S. Cl.
  CPC ............ *G06F 3/0416* (2013.01); *G06F 3/165* (2013.01); *G06K 9/00013* (2013.01); *G06F 2203/0338* (2013.01)

(58) Field of Classification Search
  CPC ............. G06K 9/0002; G06K 9/00053; G06K 9/0004; A61B 5/02427; G06F 21/316; G06F 1/1626; G06F 3/0482; G01J 5/046; H04B 1/3838
  USPC .......... 1/1; 250/338.1; 345/212; 361/679.01; 382/124; 482/8; 715/784; 178/18.03
  See application file for complete search history.

(56) References Cited

U.S. PATENT DOCUMENTS

| | | | | |
|---|---|---|---|---|
| 2004/0208345 | A1* | 10/2004 | Chou | G06K 9/0002 382/124 |
| 2004/0252867 | A1* | 12/2004 | Lan | G06K 9/0004 382/124 |
| 2005/0124463 | A1* | 6/2005 | Yeo | A61B 5/02427 482/8 |

(Continued)

*Primary Examiner* — Abdul-Samad A Adediran
(74) *Attorney, Agent, or Firm* — Matthew C. Loppnow; Dan Fiul; The Watson I.P. Group, PLC

(57) ABSTRACT

A user device can include a first thermopile, a second thermopile, a housing, and a controller. The first thermopile can be configured to sense a change in thermal energy from a user of the apparatus. The second thermopile can be configured to sense the change in the thermal energy from the user of the user device. The housing can include a thermal path for the thermal energy from the user to reach the first and second thermopiles. The first and second thermopiles can be diagonally positioned from each other relative to the housing. The controller can be coupled to the first and second thermopiles. The controller can be configured to change a configuration of at least one of a hardware element of the apparatus and a software application executing on the user device in response to coordinated sensing by the first and second thermopiles of the change in the thermal energy.

24 Claims, 6 Drawing Sheets

(56) References Cited

U.S. PATENT DOCUMENTS

| | | | | |
|---|---|---|---|---|
| 2008/0259071 A1* | 10/2008 | Nemoto | ................ | G06F 21/316 |
| | | | | 345/212 |
| 2011/0214924 A1* | 9/2011 | Perezselsky | ....... | G06K 9/00053 |
| | | | | 178/18.03 |
| 2015/0085432 A1* | 3/2015 | Memering | ............ | G06F 1/1626 |
| | | | | 361/679.01 |
| 2015/0355805 A1* | 12/2015 | Chandler | .............. | G06F 3/0482 |
| | | | | 715/784 |
| 2016/0041038 A1* | 2/2016 | Geiger | .................... | G01J 5/046 |
| | | | | 250/338.1 |
| 2016/0365886 A1* | 12/2016 | Prendergast | ......... | H04B 1/3838 |

* cited by examiner

DUAL DIAGONAL THERMOPILE CONTROL OF AN APPARATUS

CROSS-REFERENCE TO RELATED APPLICATIONS

This application is a continuation-in-part of U.S. application Ser. No. 14/919,988, titled "THERMOPILE ENHANCED FINGER PRINT SENSOR," filed on Oct. 22, 2015, and commonly assigned to the assignee of the present application, which is hereby incorporated by reference.

BACKGROUND

1. Field

The present disclosure is directed to a method and apparatus for providing enhanced functionality to an apparatus via thermopiles. More particularly, the present disclosure is directed to providing touch detection and/or approach detection to an apparatus via dual diagonally positioned dual thermopiles.

2. Introduction

Wireless devices, such as smart phones, rely on push buttons to control configuration changes. For example, wireless devices rely on two push buttons to control a volume of a music player application executing on the wireless devices. A first button controls an increase in volume of the music player application and a second button controls a decrease in volume of the music player application. Wireless devices also use another push button to activate a power on and off sequence.

Push buttons on wireless devices are a potential source of failure of the wireless devices. The space between the push buttons and a housing of the wireless devices provides a path for dirt and/or moisture to enter the wireless devices. The dirt and/or moisture can damage the wireless devices, leaving them at best unable to adjust configuration changes and at worst completely inoperable.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

There is a need for a method and apparatus, such as a user device, that can allow for enhanced functionality of the apparatus without relying on push buttons. There is a need to reduce or eliminate push buttons that can become a source of failure on the apparatus.

Embodiments provide for a method and apparatus, such as a user device, that can include a first thermopile, a second thermopile, a housing, and a controller. The first thermopile can be configured to sense a change in thermal energy from a user of the apparatus. The second thermopile can be configured to sense the change in the thermal energy from the user of the apparatus. The housing can include a thermal path for the thermal energy from the user to reach the first and second thermopiles. The first and second thermopiles can be diagonally positioned from each other relative to the housing. The controller can be coupled to the first and second thermopiles. The controller can be configured to change a configuration of at least one of a hardware element of the apparatus and a software application executing on the apparatus in response to coordinated sensing by the first and second thermopiles of the change in the thermal energy.

Embodiments provide for a method and apparatus, such as a user device, that can include a finger print sensor, a first thermopile, a second thermopile, a housing, and a controller. The finger print sensor can be configured to sense a finger print of a user of the apparatus. The first thermopile can be configured to sense a change in thermal energy from the user of the apparatus. The second thermopile can be configured to sense the change in the thermal energy from the user of the apparatus. The first and second thermopiles can be positioned proximate to the finger print sensor. The housing can include a thermal path for the thermal energy from the user to reach the first and second thermopiles. The first and second thermopiles can be diagonally positioned from each other relative to the housing. The controller can be coupled to the first and second thermopiles. The controller can be configured to change a configuration of at least one of a hardware element of the apparatus and a software application executing on the apparatus in response to coordinated sensing by the first and second thermopiles of the change in the thermal energy.

Figure 1:
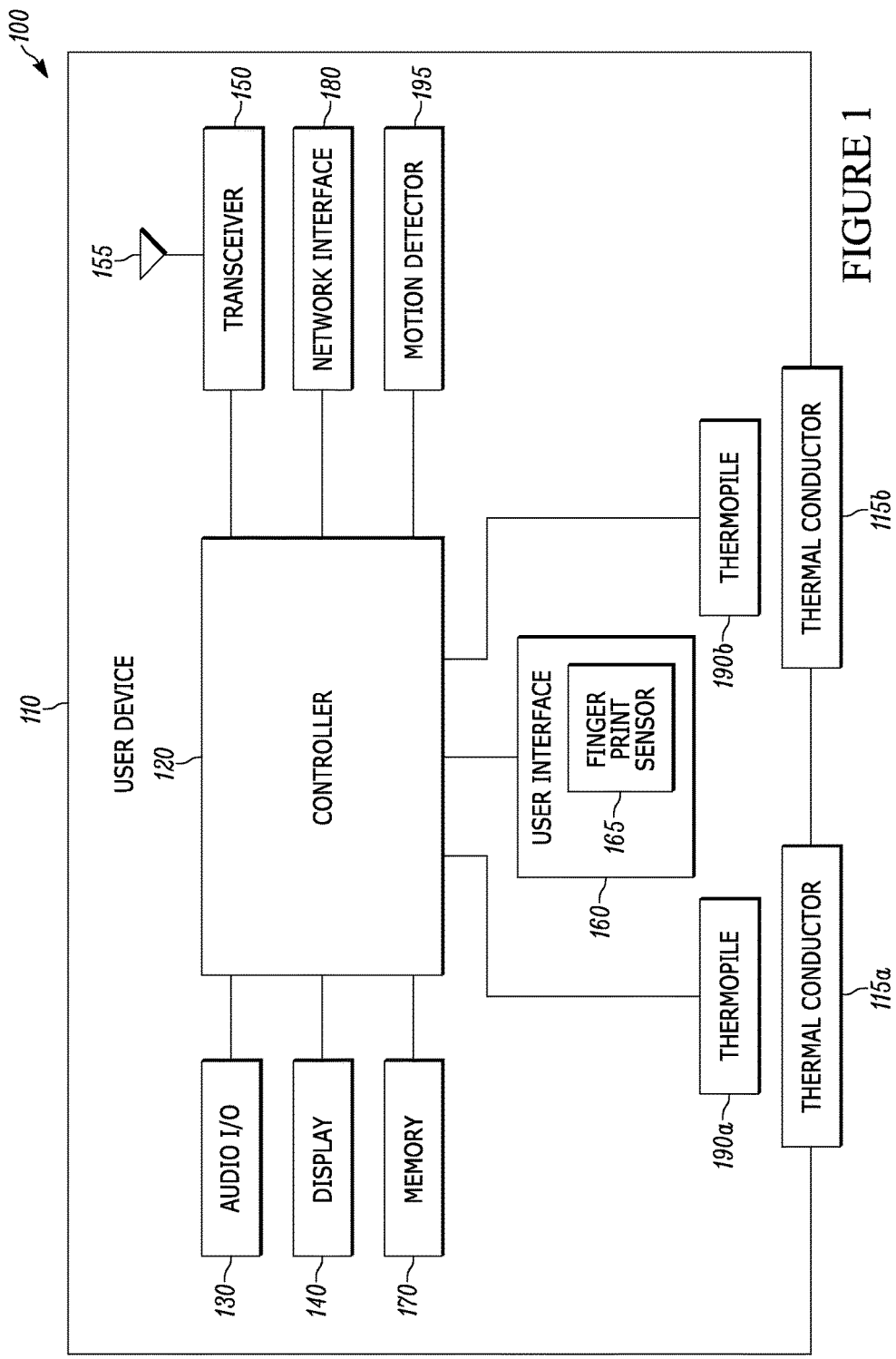
FIG. 1 illustrates a block diagram of an example user device including dual diagonal thermopiles, according to one or more possible embodiments.

FIG. 1 illustrates a block diagram of an example user device 100 including dual diagonal thermopiles 190a and 190b, according to one or more possible embodiments. The user device 100, an apparatus, can be a wireless terminal, a portable wireless communication device, a smartphone, a cellular telephone, a flip phone, a personal digital assistant, a personal computer, a tablet computer, a remote control, or any other user device 100 that can benefit from dual diagonal thermopiles 190a and 190b and/or benefit from reducing or eliminating push buttons.

The user device 100 can include a housing 110, a controller 120 within the housing 110, audio input and output circuitry 130 coupled to the controller 120, a display 140 coupled to the controller 120, a transceiver 150 coupled to the controller 120, an antenna 155 coupled to the transceiver 150, a user interface 160 coupled to the controller 120, a memory 170 coupled to the controller 120, a first thermopile 190a coupled to the controller 120, a second thermopile 190b coupled to the controller 120, a motion detector 195, such as an accelerometer, coupled to the controller 120, and a network interface 180 coupled to the controller 120. The user device 100 can perform the methods described in all the embodiments.

The display 140 can be a viewfinder, a liquid crystal display (LCD), a light emitting diode (LED) display, a plasma display, a projection display, a touch screen display, or any other device that displays information. The transceiver 150 can include a transmitter and/or a receiver. The audio input and output circuitry 130 can include a microphone, a speaker, a transducer, or any other audio input and output circuitry. The user interface 160 can include a keypad, a keyboard, buttons, a touch pad, a joystick, a touch screen display, another additional display, the finger print sensor 165, and/or any other device useful for providing an interface between a user and an electronic device. The network interface 180 can be a universal serial bus port, an Ethernet port, an infrared transmitter/receiver, a USB port, an IEEE 1394 port, a WLAN transceiver, or any other interface that can connect an apparatus to a network or computer and that can transmit and receive data communication signals. The memory 170 can include a random access memory, a read only memory, an optical memory, a flash memory, a removable memory, a hard drive, a cache, or any other memory that can be coupled to the user device 100.

The user device 100 or the controller 120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 170 or elsewhere on the user device 100. The user device 100 or the controller 120 may also use hardware to implement disclosed operations. For example, the controller 120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 120 may be any controller or processor device or devices capable of operating an electronic device and implementing the disclosed embodiments.

The network interface 180 can be a wired communication interface, such as a universal serial bus interface, a serial wire interface, a parallel wire interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces. The transceiver 150 can be a wireless wide area network transceiver that can transmit and receive wireless wide area network communication signals.

The thermopiles 190a and 190b can include digital outputs. The thermopiles 190a and 190b can sense a change in thermal energy that occurs outside of and/or on a surface of the housing 110, and generate a heat signature accordingly. Such a change in thermal energy can be a result of a user touching the housing 110 and/or a user approaching the housing 110 within a range that allows detection of the user's thermal energy by the thermopiles 190a and 190b. Each of the thermopiles 190a and 190b can include a plurality of thermocouples in series or in parallel. The thermopiles 190a and 190b can be identical or of different configurations. The thermopiles 190a and 190b can operate on less than 10 micro amps, individually or can operate using any other current. The thermopiles 190a and 190b can be positioned diagonally from each other relative to the housing 110. The thermopiles 190a and 190b can be positioned proximate to the finger print sensor 165, for example, positioned proximate to opposite corners of the finger print sensor 165. In one or more alternate embodiments, the thermopiles 190a and 190b can be positioned away from the finger print sensor 165.

The thermopiles 190a and 190b can trigger a configuration change of at least one of a hardware element of the user device 100 and a software application executing on the user device 100. The thermopiles 190a and 190b can trigger such a configuration change in response to the thermopiles 190a and 190b sensing a change in thermal energy. The controller 120 can change such a configuration based on signals from the thermopiles 190a and 190b. In one or more embodiments, the thermopiles 190a and 190b can remain activated even when other electronic components of the user device 100 are turned off to conserve power. In such an instance, the thermopiles 190a and 190b can turn on the user device 100 when sensing a change in thermal energy. The thermopiles 190a and 190b can activate the other hardware elements of the user device 100 when sensing a change in thermal energy, replacing the functionality of a power button that performs such a function on user devices.

Thermopiles 190a and 190b can sense contact thermal energy from a user of the user device 100 contacting the housing 110 of the user device 100 and/or non-contact thermal energy from the user within proximity of the housing 110 of the user device 100. For example, a user of the user device 100 can touch the housing 110 of the user device 100 for a predetermined period of time. After the predetermined period of time, the thermopiles 190a and 190b can trigger the user device 100 to be turned off if the user device 100 is currently turned on, and can trigger the user device 100 to be turned on if the user device 100 is currently turned off. For example, a user of the user device 100 can wave their hand within proximity of the thermopiles 190a and 190b to trigger a change in configuration of the user device 100. The configuration change can be a change in screen brightness, a change in sound volume, a change in web page viewable area, page turning, and/or any other configuration change that can increase and/or decrease.

The housing 110 of the user device 100 can include one or more thermal conductors 115, such as thermal conductors 115a and 115b. The thermal conductors 115a and 115b can be of a similar configuration or of different configurations. The thermal conductors 115a and 115b can be made of a same material or of different materials. The thermal conductors 115a and/or 115b can provide a thermal path for thermal energy in contact with the housing 110 and/or non-contact thermal energy from outside of the housing 110 to reach the thermopiles 190a and 190b. The thermal conductors 115a and 115b can be made of a different material than that with which the housing 110 is constructed, or can be a same material as that with which the housing 110 is constructed. The thermal conductors 115a and 115b can include a metal, such as aluminum, stainless steel, titanium, brass, and/or any other material that allows for thermal conduction, can be made of polyethylene, silicone, germanium, infrared chalcogenide glass, and/or can be made of any other thermally conductive material that allows thermal energy to reach the thermopiles 190a and 190b.

The user interface 160 can include the thermal conductors 115a and 115b. The thermal conductors 115a and 115b can make up at least a portion of the housing 110, for example a glass portion of a touch screen display that makes up a portion of the housing 110. The thermal conductors 115a and 115b can be positioned proximate to the finger print sensor 165 and/or proximate to a front side of the user device 100. The thermal conductors 115a and 115b can provide a thermal path for thermal energy proximate to the front of the user device 100 to reach the thermopiles 190a and 190b. In one or more embodiments, the thermal conductors 115a and 115b can also be proximate to a back of the user device 100. The thermal conductors 115a and 115b can provide a thermal path for thermal energy proximate to the back of the user device 100 to reach the thermopiles 190a and 190b, respectively.

Figure 2A:
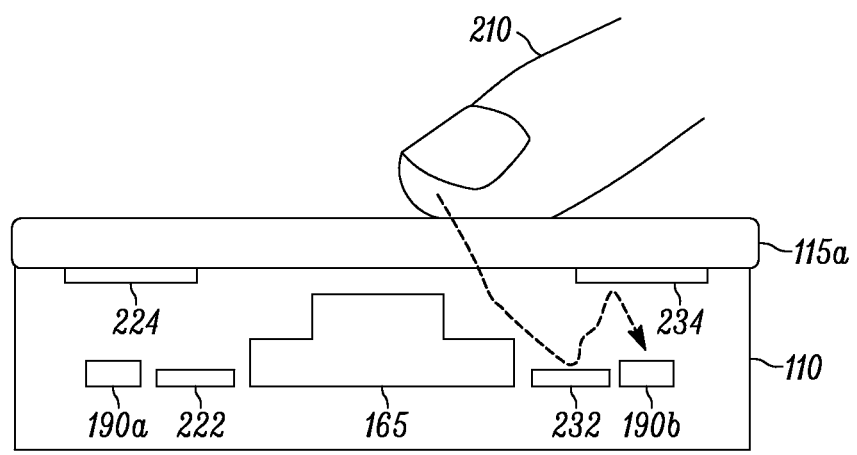
FIGS. 2A-B illustrate a cross sectional view of an example user device utilizing the dual diagonal thermopiles, according to one or more possible embodiments.
Figure 2B:
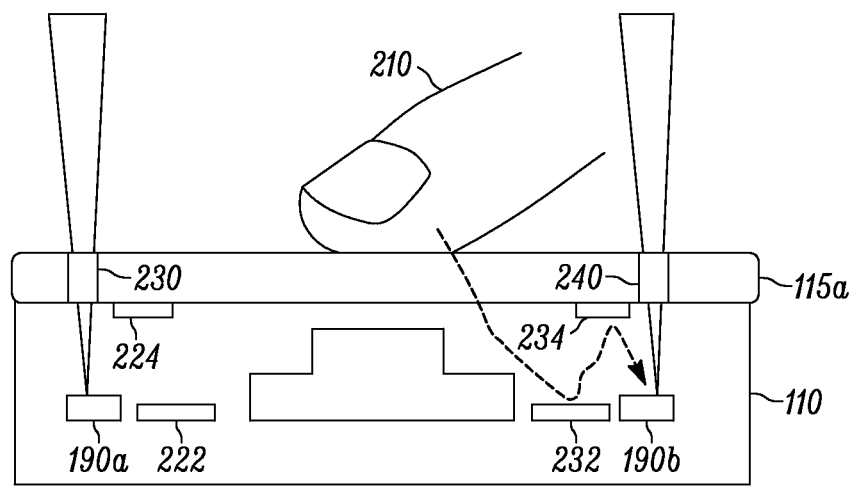

FIGS. 2A-B illustrate a cross sectional view of an example user device 100 utilizing dual diagonal thermopiles 190a and 190b, according to one or more possible embodiments.

The user device 100 can include a thermal conductor 115a that makes up a top portion of the housing 110, for example a portion of the user interface 160 that makes up the housing 110. The thermal conductor 115a can be constructed of, for example, glass, ceramic, sapphire crystal, or any other material that allows for thermal energy transfer through the housing 110 from the finger 210. The thermal conductor 115a can conduct thermal energy from a point of contact of the finger 210 to another thermal conductor, such as aluminum and/or portions of a touch screen display of the user interface 160.

The user device 100 can include thermal guides or reflectors 222, 224, 232, and 234 as part of a thermal path from the finger 210 of a user of the user device 100 to the thermopiles 190a and 190b. The thermal conductor 115a can conduct thermal energy from the finger 210 of the user of the user device 100 to the reflectors 222 and 232. Reflectors 222 and 232 can be positioned between the finger print reader 165 and the thermopiles 190a and 190b, respectively. Reflectors 234 and 224 can be positioned in front of the thermopiles 190a and 190b, respectively. The reflectors 222, 224, 232, and 234 can be made of metal, for example aluminum, stainless steel, titanium, and/or any other material that allows for thermal reflection. Four reflectors 222, 224, 232, and 234, such as reflectors 222 and 224 proximate to thermopile 190a and reflectors 232 and 234 proximate to thermopile 190b, can conduct thermal energy from the finger 210 touching the thermal conductor 115a of the housing 110 to the thermopiles 190a and 190b. However, the location, position, number, and size of the reflectors can be a function of the orientation of the thermopiles 190a and 190b and a function of a direction from which thermal energy is emanating. The thermal reflection used herein can follow wave reflection mechanisms from the finger 210 to the thermopiles 190a and 190b.

As shown, thermal energy from the finger 210 can pass through the thermal conductor 115a. The thermal energy can then first bounce off of reflector 232 to reach reflector 234. The thermal energy can next bounce off of reflector 234 to reach the thermopile 190b. Likewise, thermal energy from the finger 210 can pass through the thermal conductor 115a and bounce off of reflectors 222 and 224 to reach thermopile 190a. The configuration of the reflectors 222, 224, 232, and 234 shown in FIGS. 2A and 2B can provide narrow paths between the finger print sensor 165 and reflectors 224 and 234 for thermal energy from the finger 210 to reach the reflectors 222 and 232, respectively. These narrow paths can be beneficial to limit activation of the thermopiles 190a and 190b to when the finger 210 is touching the thermal conductor 115a within a narrow area on the surface of the thermal conductor 115a between the finger print sensor 165 and the reflectors 224 and 234.

FIG. 2B illustrates a cross sectional view of the example user device 100 shown in FIG. 2A utilizing approach detection, according to one or more possible embodiments. The user device 100 can utilize one or more of touch detection and approach detection. The user device 100 can include one or more windows 230 and/or 240 within the housing 110 to allow non-contact thermal energy from the user of the user device 100 to reach the thermopiles 190a and 190b, respectively. The thermal conductor 115a of the housing 110 can include the windows 230 and 240 through which such non-contact thermal energy within proximity of a front of the user device 100 can reach the thermopile 190a and/or 190b. For example, windows 230 and 240 can provide a thermal path for thermal energy from the finger 210 to reach the thermopiles 190a and 190b, respectively. Such thermal energy can be conducted as the finger 210 approaches the thermal conductor 115a but before the finger 210 touches the thermal conductor 115a. The use device 100 can include reflectors 224 and 234 positioned in front of and offset to the thermopiles 190a and 190b proximate to the windows 230 and 240, respectively. Reflectors 224 and 234 can be sized to provide a thermal path for both thermal energy from a finger 210 touching a surface of the thermal conductor 115a to reach one or more of thermopiles 190a and 190b and non-touch thermal energy in a proximity of the user device 100 to pass through windows 230 and/or 240 to reach the thermopiles 190a and/or 190b.

The windows 230 and/or 240 can be filled with a thermally conductive material that allows the non-touch thermal energy within the proximity of the user device 100 to reach the thermopiles 190a and 190b. The windows 230 and/or 240 can be an existing window within the housing 110 of the user device 100, such as a speaker opening, microphone opening, charging port opening, and/or any other openings within the housing 110 of the user device 100. The windows 230 and/or 240 can be filled with, for example, polyethylene, such as high density thin polyethylene (HDPE), silicone, germanium, infrared chalcogenide glass, speaker mesh, and/or any other material that allows non-contact thermal energy within the proximity of the user device 100 to reach the thermopiles 190a and/or 190b.

The windows 230 and 240 can be holes in the thermal conductor 115a sized to provide a narrow field of view. Such a narrow field of view can limit extraneous thermal energy from reaching the thermopiles 190a and 190b, such as other persons within a vicinity of a user using the user device 100. The windows 230 and 240 can be of various shapes, such as rectangular, oval, and/or any other non-symmetric shape, to allow the thermopiles 190a and 190b to generate unique heat signatures when the finger 210 passes in a first direction across the housing 110 and when the finger 210 passes in a second direction across the housing 110. For example, windows 230 and/or 240 can be shaped to allow the thermopiles 190a and 190b to generate unique heat signatures when the user swipes left-to-right and right-to-left. The windows 230 and/or 240 can be shaped to allow the thermopiles 190a and 190b to generate different unique heat signatures when the user swipes top-to-bottom, bottom-to-top, left-to-right, and right-to-left.

The windows 230 and 240 can provide a thermal path for thermal energy from a user of the user device 100 to reach the thermopiles 190a and 190b, respectively, even when the user is not touching the thermal conductor 115a. For example, the thermopiles 190a and 190b can generate coordinated heat signatures from thermal energy generated when a user of the user device 100 is looking into the windows 230 and 240 while not touching the thermal conductor 115a. For example, the user device 100 can determine, via the motion detector 195, that the user device 100 is stationary or moving. The user device 100 can determine, via the motion detector 195, that the user has picked up the user device 100. The user device 100 can determine that the user is looking into the user device 100, via the thermal energy passing from the user through one or more of windows 230 and 240 to one or more of the thermopiles 190a and 190b. The thermopiles 190a and 190b can generate heat signatures from the thermal energy sensed by the thermopiles 190a and 190b while a user of the user device 100 is looking into the windows 230 and 240. In such an instance, the thermopiles 190a and 190b can trigger the controller 120 to wake up the display 140 from a non-active state.

For example, the user device 100 can determine that a person, other that the user of the user device 100, has entered a field of view of the user device 100. The thermopiles 190a and 190b can detect a change in thermal energy, via the windows 230 and 240, and generate a baseline heat signature when a user of the user device 100 begins interaction with the user device 100. The thermopiles 190a and 190b can detect a change in thermal energy, via the windows 230 and 240, and generate an updated heat signature indicating multiple heat signatures are detected via the windows 230 and 240, when an extraneous person that is not the user of the user device 100 enters a field of view of the user device 100. The user device 100 can display a message to the user of the user device 100 informing the user that a possible privacy breach has occurred due to an extraneous person entering a field of view of the user device 100. In one or more embodiments, the user device 100 can close or minimize a software application executing on the user device 100 in response to the thermopiles 190a and 190b detecting an extraneous person within a field of view of the user device 100 to protect privacy. In one or more embodiments, the user device 100 can lock itself and display a screen saver in response to the thermopiles 190a and 190b detecting an extraneous person within a field of view of the user device 100 to protect privacy.

The thermopiles 190a and 190b can be positioned offset away from the finger print sensor 165. Such a position can allow the finger print sensor 165 to detect the finger 210 touching the finger print sensor 165. Such a position can also prevent saturation of the thermopiles 190a and 190b that would occur should the finger 210 cover the windows 230 and/or 240 and the thermopiles 190a and 190b were placed immediately adjacent to the finger print sensor 165.

The finger print sensor 165 consumes power even when not reading a finger print of the finger 210. The user device 100 can turn off the finger print sensor 165 to conserve power. The user device 100 can detect, via windows 230 and/or 240 and thermopiles 190a and/or 190b, thermal energy from the finger 210 approaching the finger print sensor 165. The user device 100 can activate the finger print sensor 165 in response to the finger 210 approaching the finger print sensor 165 to conserve power.

FIGS. 3A-D illustrate a cross sectional view of an example user device 100 utilizing metallic thermal conduction, according to one or more possible embodiments.

Figure 3A:
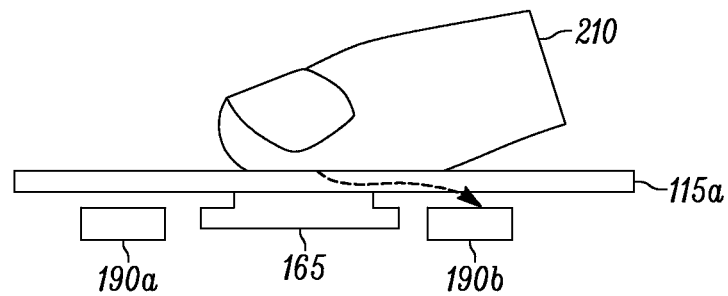
FIGS. 3A-D illustrate a cross sectional view of an example user device utilizing metallic thermal conduction, according to one or more possible embodiments.
Figure 3B:
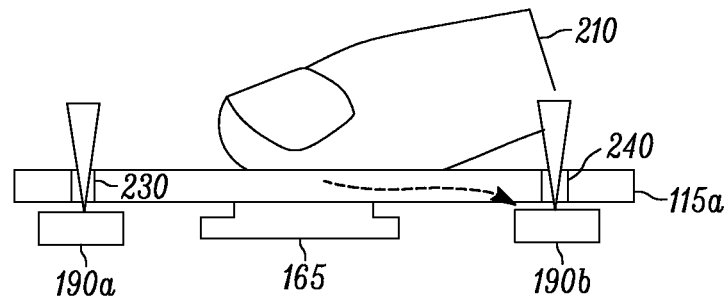

As shown in FIGS. 3A and 3B, the user device 100 can include a metallic thermal conductor 115a, such as aluminum, titanium, stainless steel, brass, or any other material that allows for thermal energy conduction, that can make up at least a portion of a top portion of the housing 110. The use of a metallic thermal conductor 115a can allow for the thermopiles 190a and/or 190b to sense thermal energy without using the reflectors 222, 224, 232, and 234 shown in FIGS. 2A and 2B. The thermopiles 190a and 190b can sense the thermal energy without using the reflectors 222, 224, 232, and 234 if positioned with a proper orientation and pointing in a proper direction. The user device 100 can further include windows 230 and 240 that can provide a thermal path for non-contact thermal energy from a user of the user device 100 to reach the thermopiles 190a and 190b, respectively.

Figure 3C:
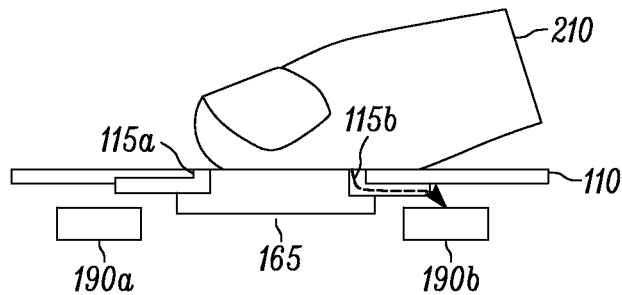
Figure 3D:
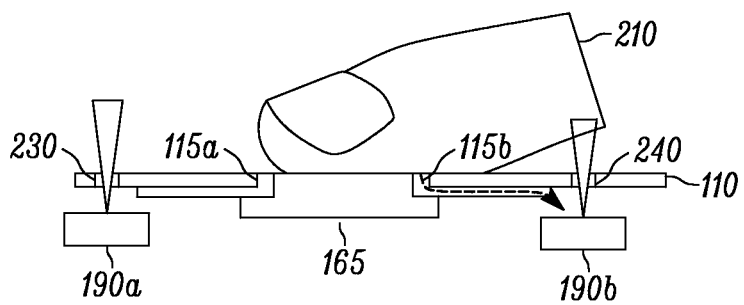

As shown in FIGS. 3C and 3D, the user device 100 can include metallic thermal conductors 115a and 115b that can be portions of the housing 110. The thermal conductors 115a and 115b portion of the housing 110 can extend from a top of the top portion of the housing 110 to a bottom of the top portion of the housing 110. The thermal conductor 115a can extend along at least one side of the finger print sensor 165. The thermal conductor 115b can extend along at least another side of the finger print sensor 165. The thermal conductors 115a and 115b can extend along a bottom of the top portion of the housing 110 between the finger print sensor 165 to an area above the thermopiles 190a and 190b, respectively. Thermal conductor 115a can conduct thermal energy from the finger 210 to the thermopile 190a when the finger 210 contacts an area next to the finger print sensor 165. Thermal conductor 115b can conduct thermal energy from the finger 210 to the thermopile 190b when the finger 210 contacts an area next to the finger print sensor 165. The user device 100 can further include windows 230 and 240 that can provide a thermal path for non-contact thermal energy from a user of the user device 100 to reach the thermopiles 190a and 190b, respectively.

Figure 4:
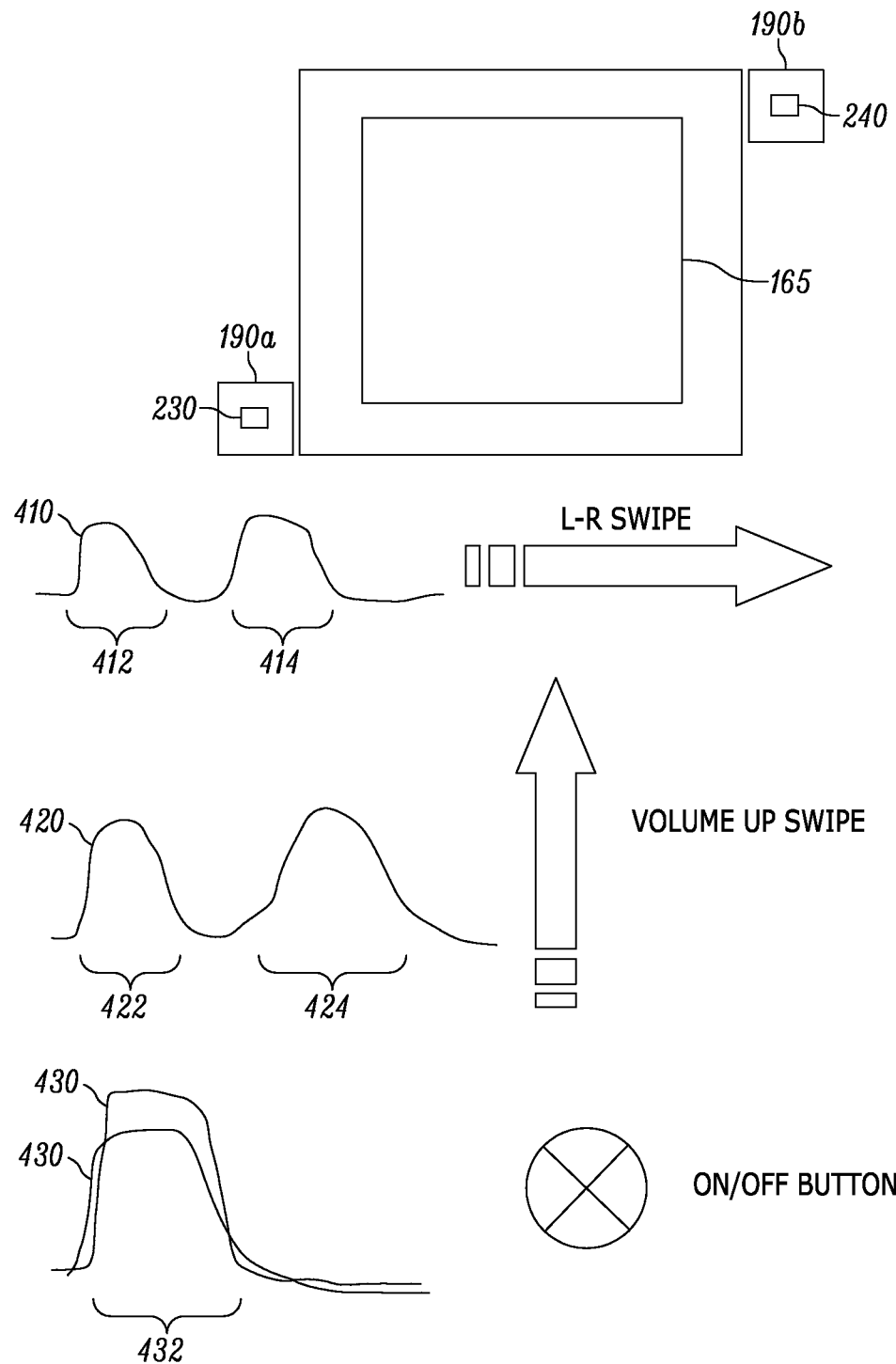
FIG. 4 illustrate a top view of the dual diagonal thermopiles, according to one or more possible embodiments.

FIG. 4 illustrate a top view of the dual diagonal thermopiles 190a and 190b, according to one or more possible embodiments. The thermopiles 190a and 190b can be positioned diagonally from each other relative to the housing 110. The thermopiles 190a and 190b can be positioned proximate to diagonal corners of the fingerprint reader 165. As illustrated, the thermopiles 190a and 190b can include windows 230 and 240 positioned centrally over the thermopiles 190a and 190b. The thermopiles 190a and 190b can generate unique heat signatures to distinguish between a heat source away from the user device 100 and a heat source touching the user device 100. Such unique heat signatures can be based on thermal signal levels and/or one or more pre-established profiles for when the user device 100 is being touched, when the user device 100 is receiving non-touch thermal energy, when the user device is receiving a strong thermal signal, when a distance between the thermopiles 190a and 190b to a touch point is constant, and/or any other event that can be a basis for a profile.

A user of the user device 100 can touch a finger 210 to the thermal conductor 115a and/or 115b of the housing 110. The thermopiles 190a and 190b can generate coordinated heat signatures 410, 420, and 430 indicating a change in thermal energy from the finger 210 moving along the thermal conductor 115a and/or 115b of the housing 110. For example, the user of the user device 100 can swipe a finger 210 left-to-right, right-to-left, bottom-to-top, and/or top-to-bottom across the housing 110 of the user device 100. The user can hold a finger 210 against the housing 110 proximate to the thermopiles 190a and 190b. The user can tap a finger 210 against the housing 110 proximate to the thermopiles 190a and 190b. The thermopiles 190a and 190b can generate unique coordinated heat signatures 410, 420, and/or 430 for each such swipe, hold, and/or tap. Likewise, coordinated heat signatures 410, 420, and 430 can be generated when the thermopiles 190*a* and 190*b* detect, via the windows 230 and 240, a change in thermal energy from non-contact thermal energy within proximity of the housing 110.

The coordinated heat signature 410 can provide a first indication 412 of a change in thermal energy from the user passing their finger 210 across thermopile 190*a*. The coordinated heat signature 410 can provide a second indication 414 of a change in thermal energy from the user passing their finger 210 across thermopile 190*b*. Such a left-to-right swipe can generate the coordinated heat signature 410. The coordinated heat signature 410 can provide an indication as to the speed at which the finger 210 of the user passes between thermopile 190*a* and 190*b*. Likewise, a right-to-left swipe can generate a unique coordinated heat signature.

For example, the memory 170 of the use device 100 can include a document review application, such as a web page browser, a word processor, a picture viewer, a navigation application, and/or any other software application that allows for scrolling or panning left, right, up and/or down of a document under review, that allows a user of the user device 100 to review a document. The coordinated heat signature 410 can be used to change a configuration of the document review application and the display 140. The coordinated heat signature 410 can provide an indication that a user of the user device 100 desires to pan a viewed document to the right. The controller 120 can control display 140 to display a different portion of the document under review in response to the first and second thermopiles 190*a* and 190*b* generating the coordinated heat signature 410. Likewise, the first and second thermopiles 190*a* and 190*b* can sense a right-to-left swipe that would generate a unique heat signature. Such a unique heat signature can trigger the controller 120 to pan a document under review on the document review application to the left. Such scrolling or panning can be continuous for as long as the user of the user device 100 holds the finger 210 against the housing 110 of the user device 100 or incremental in response to the user of the user device 100 momentarily touching the housing 110 of the user device 100.

The coordinated heat signature 420 can provide a first indication 422 of a change in thermal energy from the user passing their finger 210 across thermopile 190*a*. The coordinated heat signature 420 can provide a second indication 424 of a change in thermal energy from the user passing their finger 210 across thermopile 190*b*. Such a bottom-to-top swipe can generate the coordinated heat signature 420. The coordinated heat signature 420 can provide an indication as to the speed at which the finger 210 of the user passes between thermopile 190*a* and 190*b*. Likewise, a top-to-bottom swipe can generate a unique coordinated heat signature.

For example, the memory 170 of the use device 100 can include a music player application configured to play digital music. The coordinated heat signature 420 can be used to change a configuration of the music player application and the audio input and output circuitry 130. The coordinated heat signature 420 can provide an indication that a user of the user device 100 desires to increase a sound volume of music playing on the music player application. The controller 120 can increase a sound volume configuration of the music player application in response to the first and second thermopiles 190*a* and 190*b* generating the coordinated heat signature 420. Likewise, the first and second thermopiles 190*a* and 190*b* can sense a right-to-left swipe that would generate a unique heat signature. Such a unique heat signature can trigger the controller 120 to decrease the sound volume of the music player application.

The coordinated heat signature 430 can provide a first and second indication 432 of approximately equal amounts of a change in thermal energy from a user holding their finger 210 proximate to the first and second thermopiles 190*a* and 190*b*, substantially simultaneously. The coordinated heat signature 430 can provide an indication as to how long the user holds their finger 210 proximate to the first and second thermopiles 190*a* and 190*b*. The length of time that the user of the user device 100 holds their finger 210 proximate to the first and second thermopiles 190*a* and 190*b* can be used to trigger a configuration change of at least one of a hardware element of the user device 100 and a software application executing on the user device 100.

The length of time that the user of the user device 100 holds a finger 210 over both the first and second thermopiles 190*a* and 190*b* can be used as a basis for implementing different configuration changes. For example, a user holding a finger 210 proximate to the first and second thermopiles 190*a* and 190*b* for approximately two seconds can trigger a first configuration change. A user holding a finger 210 proximate to the first and second thermopiles 190*a* and 190*b* for approximately four seconds can trigger a second configuration change. For example, the coordinated heat signature 430 can be used to change a configuration of the user device 100. The controller 120 can receive the coordinated heat signature 430 and at least one of turn the user device 100 "ON" from a powered down state and "OFF" from a powered up state.

One or more of the first and second thermopiles 190*a* and 190*b* can generate one or more unique heat signatures when the user of the user device 100 momentarily touches the user device 100 proximate to the first and second thermopiles 190*a* and/or 190*b*. For example, the user of the user device 100 can "tap" the housing 110 of the user device 100 proximate to the first and/or second thermopiles 190*a* and 190*b*. Such tapping can trigger the controller 120 to change a configuration of a software application executing on the user device 100. Such a configuration change can include skipping to a next song, skipping to a next picture, taking a picture, turning a light on and off, panning left, right, up, and/or down while displaying a document under review, and/or any other configuration change that can be triggered with a momentary touch of the user device 100. In one or more embodiments, such tapping can trigger a configuration change as is presently triggered in response to a mouse button being pressed.

Figure 5:
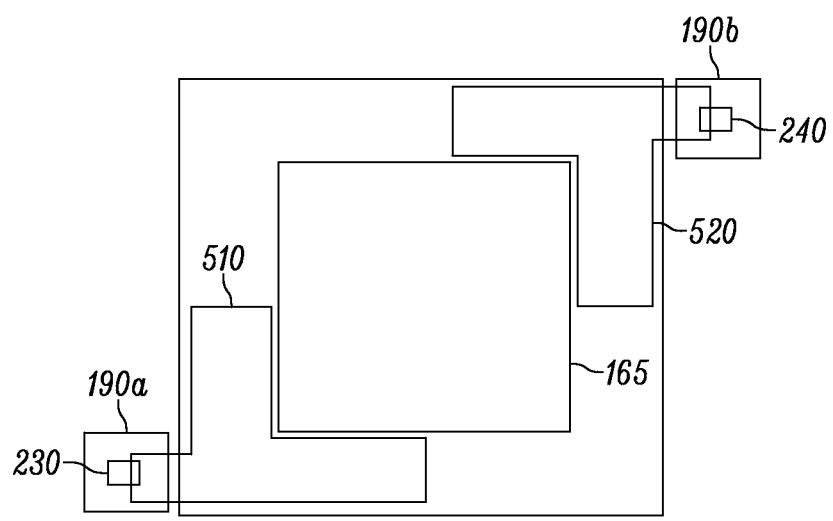
FIG. 5 illustrates dual diagonal thermopiles utilizing metallic plates, according to one or more possible embodiments.

FIG. 5 illustrates dual diagonal thermopiles 190*a* and 190*b* utilizing metallic plates 510 and 520, according to one or more possible embodiments. The user device 100 can further include first and second metallic plates 510 and 520. The first and second metallic plates 510 and 520 can be positioned proximate to the first and second thermopiles 190*a* and 190*b*, respectively, and the finger print sensor 165. The first and second metallic plates 510 and 520 can at least partially extend over the first and second thermopiles 190*a* and 190*b*, respectively. The first and second metallic plates 510 and 520 can extend in at least one of a horizontal and vertical direction from the first and second thermopiles 190*a* and 190*b*, respectively. The example first and second metallic plates 510 and 520 can extend in both the horizontal and vertical direction from the first and second thermopiles 190*a* and 190*b*, respectively. A length of such extension(s) from the first and second thermopiles 190*a* and 190*b* can be the same or can be different. The first and second metallic plates 510 and 520 can be made of a same thermally conductive material or of different thermally conductive materials. For example, the first and second metallic plates 510 and 520 can be made of aluminum, stainless steel, titanium, brass, and/or any other material that allows for thermal conduction.

Figure 6:
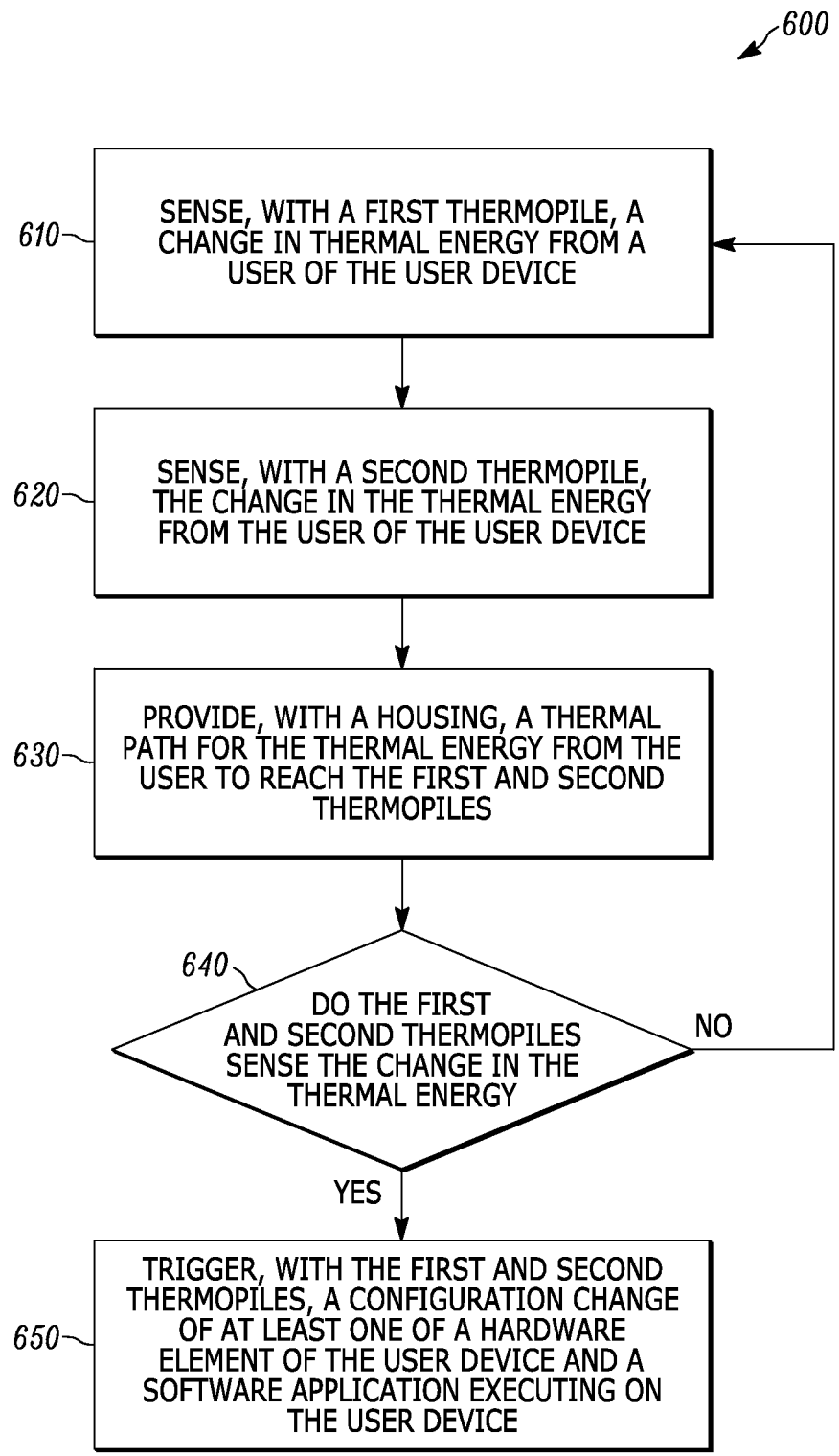
FIG. 6 illustrates a flowchart of an example method of sensing a change in thermal energy with the dual diagonal thermopiles, according to one or more possible embodiments.

FIG. 6 illustrates a flowchart of an example method of sensing a change in thermal energy with the dual diagonal thermopiles 190a and 190b, according to one or more possible embodiments.

At block 610, the method 600 can sense, with a first thermopile 190a, a change in thermal energy from the user of the user device 100. The user device 100 can sense, via the thermopile 190a, a change in contact thermal energy from the user contacting the housing 110 and/or non-contact thermal energy from the user approaching the user device 100. The use device 100 can sense the contact thermal energy via the thermal conductors 115a. The use device 100 can sense the non-contact thermal energy via window 230. Block 610 can proceed to block 620.

At block 620, the method 600 can sense, with a second thermopile 190b, the change in thermal energy from the user of the user device 100. The user device 100 can sense, via the thermopile 190b, the change in contact thermal energy from the user contacting the housing 110 and/or non-contact thermal energy from a user approaching the user device 100. The use device 100 can sense the contact thermal energy via the thermal conductor 115b. The use device 100 can sense the non-contact thermal energy via window 240. Block 620 can proceed to block 630.

At block 630, the method 600 can provide, with at least a portion of the housing 110, the thermal conductors 115a and 115b as the thermal path for the thermal energy from a user of the user device 100 to reach the thermopiles 190a and 190b, respectively. Block 630 can proceed to block 640.

At block 640, the method 600 can determine whether the first and second thermopiles 190a and 190b sense a change in thermal energy. Such a change in thermal energy can occur when one or more of the first and second thermopiles 190a and 190b sense a top-to-bottom swipe, bottom-to-top swipe, left-to-right swipe, right-to-left swipe, a hold, a tap, motions within a proximity to the user device 100, and/or any other change in thermal energy detected by one or more of the first and second thermopiles 190a and 190b. In response to the thermopiles 190a and 190b sensing the change in thermal energy, block 640 can branch to block 650. Should the thermopiles 190a and 190b not sense the change in the thermal energy, block 640 can branch to block 610 to continue monitoring for the change in the thermal energy.

At block 650, the method 600 can change, with the controller 120, a configuration of at least one of a hardware element of the user device 100 and a software application executing on the user device 100 in response to coordinated sensing by the first and second thermopiles 190a and 190b of the change in the thermal energy.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. An apparatus, comprising:
    a finger print sensor that senses a finger print of a user of the apparatus;
    a first thermopile only outside of the finger print sensor, where the first thermopile senses a change in thermal energy from a user of the apparatus;
    a second thermopile only outside of the finger print sensor, where the second thermopile senses the change in the thermal energy from the user of the apparatus, wherein the first and second thermopiles are positioned on different sides of the finger print sensor, and wherein the first thermopile and the second thermopile generate a coordinated heat signature indicating the change in thermal energy from a user sliding their finger across the finger print sensor, where the change in thermal energy corresponds to the speed and direction of movement of the finger;

a housing including a thermal path for the thermal energy from the user to reach the first and second thermopiles, where the first and second thermopiles are diagonally positioned from each other relative to the housing; and a processor coupled to the first and second thermopiles and the finger print sensor, where the processor changes a configuration of at least one selected from a hardware element of the apparatus and a software application executing on the apparatus in response to coordinated sensing by the first and second thermopiles of the change in the thermal energy, wherein the processor changes a configuration of at least one selected from the hardware element of the apparatus and the software application executing on the apparatus based on the coordinated heat signature indicating the change in thermal energy from the user sliding their finger across the finger print sensor.

2. The apparatus according to claim 1, further comprising:

a first metallic plate proximate to the finger print sensor and the first thermopile, the first metallic plate providing a first plated thermal path for the change in the thermal energy to reach the first thermopile; and a second metallic plate proximate to the finger print sensor and the second thermopile, the second metallic plate providing a second plated thermal path for the change in the thermal energy to reach the second thermopile.

3. The apparatus according to claim 1, wherein the housing includes at least one of metal, glass, ceramic, and sapphire crystal that provide a contact thermal path for the thermal energy to reach the thermopiles.

4. The apparatus according to claim 1, wherein the first and second thermopiles sense the change in the thermal energy generated in response to at least one of the user contacting the housing of the apparatus and the user being in non-contact proximity to the housing of the apparatus.

5. The apparatus according to claim 1, wherein the processor changes the configuration of at least one selected from the hardware element of the apparatus and the software application executing on the apparatus in response to the first and second thermopiles sensing approximate equal amounts of thermal energy from the user of the apparatus.

6. The apparatus according to claim 1, further comprising:

a first window in front of the first thermopile, the first window providing a first non-contact thermal path for non-contact thermal energy proximate to the housing to reach the first thermopile; and a second window in front of the second thermopile, the second window providing a second non-contact thermal path for the non-contact thermal energy proximate to the housing to reach the second thermopile.

7. The apparatus according to claim 6, wherein the first and second windows are comprised of at least one of polyethylene, silicone, germanium, infrared chalcogenide glass, a speaker opening, a microphone opening, and a charging port opening.

8. The apparatus according to claim 1, wherein the thermal path includes first and second reflectors to reflectively conduct the thermal energy from at least one of the housing and outside of the housing to the first and second thermopiles, respectively.

9. The apparatus according to claim 1, wherein the software application comprises a music player application that plays digital music, and wherein the configuration change comprises a sound volume change of the music player application changed in response to the coordinated sensing by the first and second thermopiles of the change in the thermal energy.

10. The apparatus according to claim 1, wherein the software application comprises a document review application that allows the user to review at least one of text and picture data, and wherein the configuration change comprises panning in at least one of a horizontal and vertical direction of the document review application changed in response to the coordinated sensing by the first and second thermopiles of the change in the thermal energy.

11. The apparatus according to claim 1, wherein the apparatus comprises at least one of smartphone, a cellular telephone, a flip phone, a personal digital assistant, a personal computer, a tablet computer, and a remote control.

12. The method according to claim 1, wherein the processor turns off the finger print sensor to conserve power, detects via the first thermopile and the second thermopile a finger of the user approaching the finger print sensor, and activates the finger print sensor in response to the finger of the user approaching the finger print sensor.

13. A method, comprising:

sensing, with a finger print sensor, a finger print of the user of the apparatus;

sensing, with a first thermopile only outside of the finger print sensor, a change in thermal energy from a user of an apparatus;

sensing, with a second thermopile only outside of the finger print sensor, the change in the thermal energy from the user of the apparatus, wherein the first and second thermopiles are positioned on different sides of the finger print sensor;

generating, by the first thermopile and the second thermopile, a coordinated heat signature indicating the change in thermal energy from a user passing their finger across the finger print sensor, where the change in thermal energy corresponds to the speed and direction of movement of the finger;

providing, with a housing of the apparatus, a thermal path for the thermal energy from the user to reach the first and second thermopiles, wherein the first and second thermopiles are diagonally positioned from each other relative to the housing;

changing, with a processor coupled to the first and second thermopiles, a configuration of at least one selected from a hardware element of the apparatus and a software application executing on the apparatus in response to coordinated sensing by the first and second thermopiles of the change in the thermal energy, wherein the processor changes a configuration of at least one selected from the hardware element of the apparatus and the software application executing on the apparatus based on the coordinated heat signature indication of the change in thermal energy from the user passing their finger across the finger print sensor.

14. The method according to claim 13, further comprising:

providing, with a first metallic plate proximate to the finger print sensor and the first thermopile, a first plated thermal path for the change in the thermal energy to reach the first thermopile; and providing, with a second metallic plate proximate to the finger print sensor and the second thermopile, a second plated thermal path for the change in the thermal energy to reach the second thermopile.

15. The method according to claim 13, wherein the housing includes at least one of metal, glass, ceramic, and sapphire crystal that provide a contact thermal path for the thermal energy to reach the thermopiles.

16. The method according to claim 13, further comprising sensing, with the first and second thermopiles, the change in the thermal energy generated in response to at least one of the user contacting the housing of the apparatus and the user being in non-contact proximity to the housing of the apparatus.

17. The method according to claim 13, further comprising:
sensing, with the first and second thermopiles, approximate equal amounts of thermal energy from the user of the apparatus; and
changing, with the processor, the configuration of at least one of the hardware element of the apparatus and the software application executing on the apparatus in response to the sensing of the approximate equal amounts of thermal energy from the user of the apparatus.

18. The method according to claim 13, further comprising:
providing, with a first window in front of the first thermopile, a first non-contact thermal path for non-contact thermal energy proximate to the housing to reach the first thermopile; and
providing, with a second window in front of the second thermopile, a second non-contact thermal path for the non-contact thermal energy proximate to the housing to reach the second thermopile.

19. The method according to claim 18, wherein the first and second windows are comprised of at least one of polyethylene, silicone, germanium, infrared chalcogenide glass, a speaker opening, a microphone opening, and a charging port opening.

20. The method according to claim 13, wherein the thermal path includes first and second reflectors to reflectively conduct the thermal energy from at least one of the housing and outside of the housing to the first and second thermopiles, respectively.

21. The method according to claim 13, wherein the software application comprises a music player application that plays digital music, and
wherein the configuration change comprises a sound volume change of the music player application changed in response to the coordinated sensing by the first and second thermopiles of the change in the thermal energy.

22. The method according to claim 13, wherein the software application comprises a document review application that allows the user to review at least one of text and picture data, and
wherein the configuration change comprises panning in at least one of a horizontal and vertical direction of the document review application changed in response to the coordinated sensing by the first and second thermopiles of the change in the thermal energy.

23. The method according to claim 13, further comprising:
turning off the finger print sensor to conserve power;
detecting via the first thermopile and the second thermopile a finger of the user approaching the finger print sensor; and
activating the finger print sensor in response to the finger of the user approaching the finger print sensor.

24. An apparatus, comprising:
a display;
a finger print sensor that sense a finger print of a user of the apparatus;
a first thermopile only outside of the finger print sensor, the first thermopile sensing a change in thermal energy from the user of the apparatus;
a second thermopile only outside of the finger print sensor, the second thermopile sensing the change in the thermal energy from the user of the apparatus, wherein the first and second thermopiles are positioned on different sides of the finger print sensor, wherein the first thermopile and the second thermopile generate a coordinated heat signature indicating a change in thermal energy from a user passing their finger across the finger print sensor, where the change in thermal energy corresponds to the speed and direction of movement of the finger;
a housing including a thermal path for the thermal energy from the user to reach the first and second thermopiles, where the first and second thermopiles are diagonally positioned from each other relative to the housing; and
a processor coupled to the first and second thermopiles, the display, and the finger print sensor, the processor changing a configuration of at least one selected from a hardware element of the apparatus and a software application executing on the apparatus in response to coordinated sensing by the first and second thermopiles of the change in the thermal energy,
wherein the processor changes a configuration of at least one selected from the hardware element of the apparatus and the software application executing on the apparatus based on the coordinated heat signature indication of the change in thermal energy from the user passing their finger across the finger print sensor, where the changed configuration comprises at least one selected from scrolling a document on the display and changing the sound volume of a music player application, and
wherein the processor turns off the finger print sensor to conserve power, detects, via the first thermopile and the second thermopile, a finger of the user approaching the finger print sensor, and activates the finger print sensor in response to the finger of the user approaching the finger print sensor.

* * * * *